(12) United States Patent
Verman

(10) Patent No.: US 8,406,374 B2
(45) Date of Patent: Mar. 26, 2013

(54) X-RAY OPTICAL SYSTEMS WITH ADJUSTABLE CONVERGENCE AND FOCAL SPOT SIZE

(75) Inventor: Boris Verman, Bloomfield, MI (US)

(73) Assignee: Rigaku Innovative Technologies, Inc., Auburn Hills, MI (US)

(*) Notice: Subject to any disclaimer, the term of this patent is extended or adjusted under 35 U.S.C. 154(b) by 389 days.

(21) Appl. No.: 12/823,503

(22) Filed: Jun. 25, 2010

(65) Prior Publication Data
US 2011/0317814 A1    Dec. 29, 2011

(51) Int. Cl.
    *G21K 1/06* (2006.01)
(52) U.S. Cl. .......................... 378/85; 378/147
(58) Field of Classification Search ............. 378/84–85, 378/145–153
    See application file for complete search history.

(56) References Cited

U.S. PATENT DOCUMENTS

| | | | |
|---|---|---|---|
| 6,014,423 A | 1/2000 | Gutman et al. | |
| 6,041,099 A * | 3/2000 | Gutman et al. | 378/85 |
| 6,421,417 B1 | 7/2002 | Jiang et al. | |
| 7,245,699 B2 * | 7/2007 | Verman et al. | 378/85 |
| 7,317,784 B2 | 1/2008 | Durst et al. | |
| 8,126,117 B2 * | 2/2012 | Verman et al. | 378/135 |
| 2003/0152192 A1 | 8/2003 | Hasegawa | |

FOREIGN PATENT DOCUMENTS

WO    WO 2004/079754 A1    9/2004

OTHER PUBLICATIONS

International Search Report for PCT/US2011/041440, Dated Oct. 19, 2011.

\* cited by examiner

*Primary Examiner* — Hoon Song
(74) *Attorney, Agent, or Firm* — Brinks Hofer Gilson & Lione

(57) ABSTRACT

An x-ray optical system includes a multiple corner optic assembly including an adjustable aperture assembly located in close proximity to the optic assembly. The adjustable aperture assembly enables a user to easily and effectively adjust the convergence of an incident beam of x-rays or the optic focal spot size. The adjustable aperture assembly may further enable a user to condition x-rays of one wavelength and block x-rays of another wavelength and thereby reduce the amount of background radiation exhibited from x-rays of more than one wavelength.

17 Claims, 12 Drawing Sheets

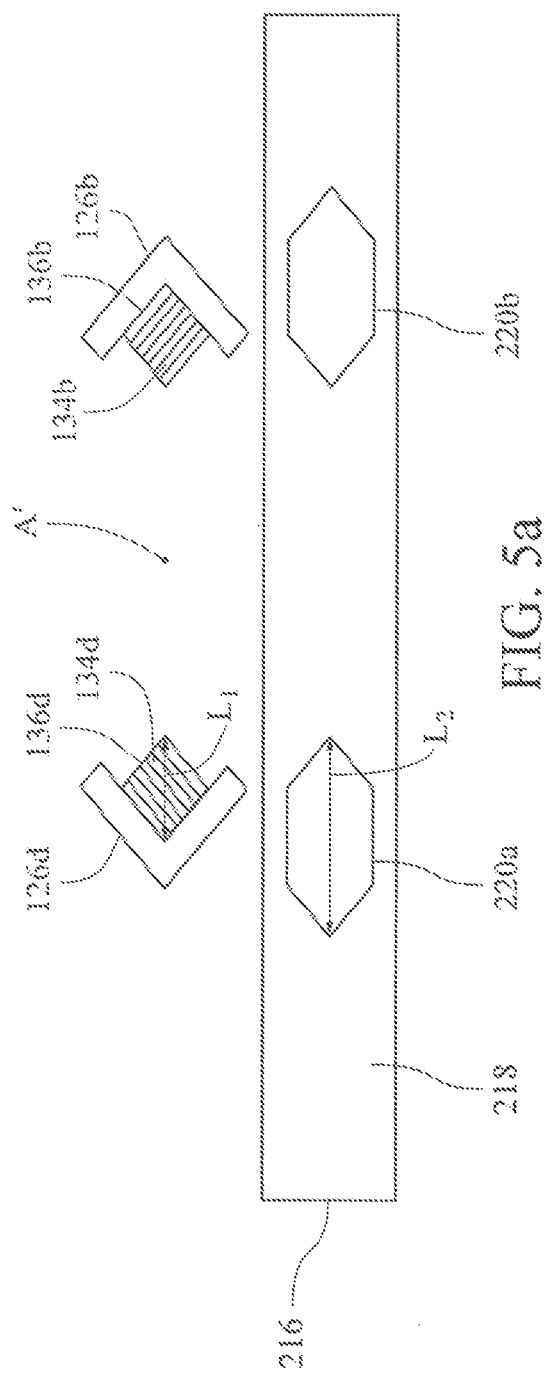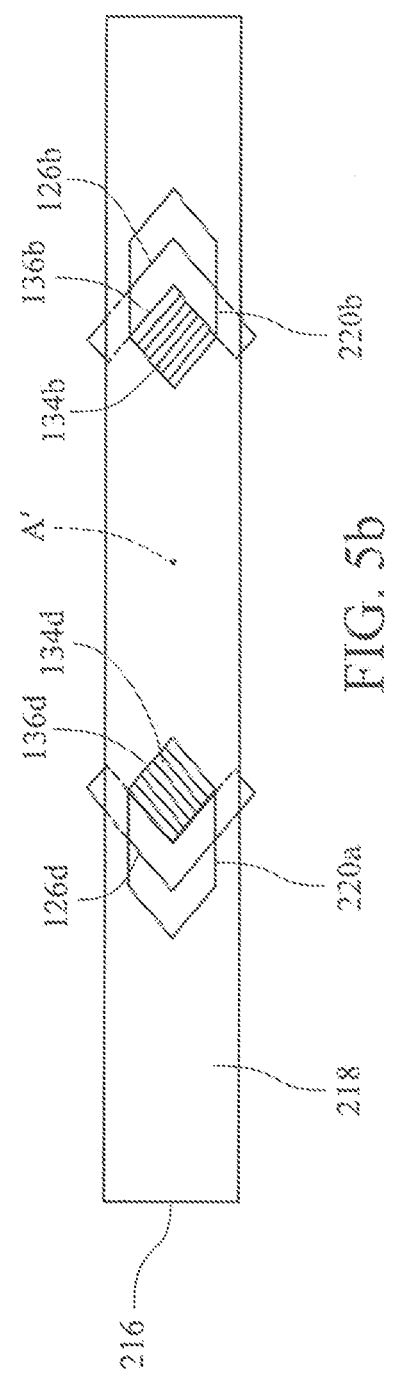

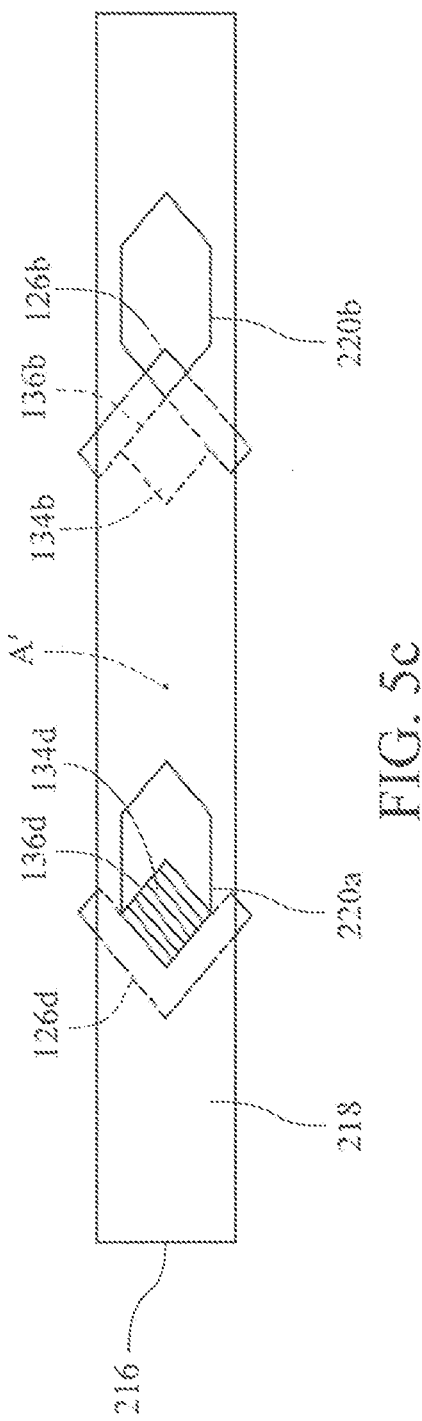
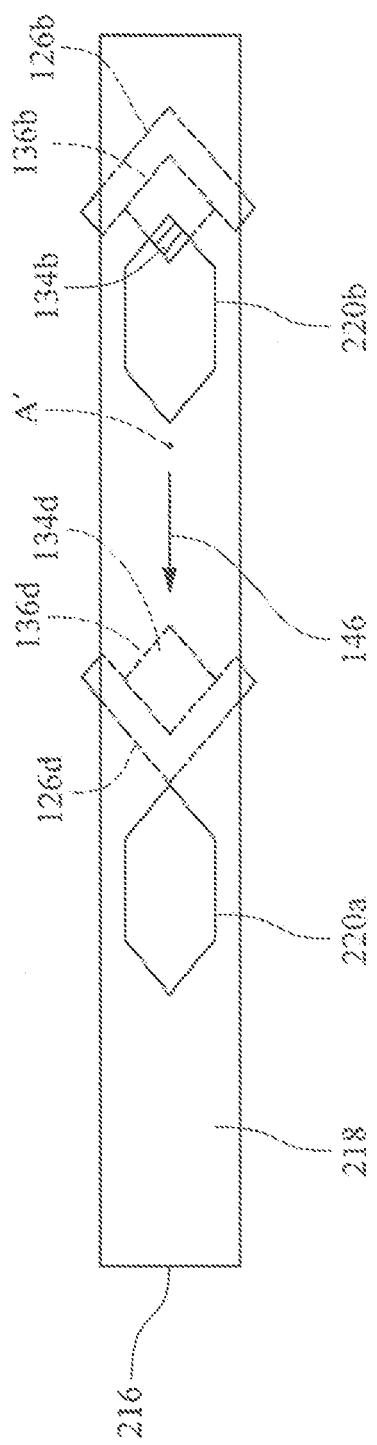

X-RAY OPTICAL SYSTEMS WITH ADJUSTABLE CONVERGENCE AND FOCAL SPOT SIZE

BACKGROUND

1. Field of the Invention

The present invention relates to an x-ray optical system. More particularly, the present invention relates to an x-ray optical system which conditions an x-ray beam.

2. Description of Related Art

X-ray optics are used in many applications such as x-ray diffraction analysis and spectroscopy that require the directing, focusing, collimation, or monochromatizing of x-ray energy from an x-ray source. Researchers have long employed focusing x-ray optics in x-ray diffraction experiments to increase the flux incident on the sample and hence to increase the signal to noise ratio of radiation received by a detector.

A focusing optic increases the flux by directing a large number of photons through the sample. However, for focusing multilayer optics, the convergence angle of such optics limits their applicability in many applications, since for an application, a different convergence angle, and thus a different optic, is often needed for different types of samples. Moreover, a number of optics with different focal lengths are used to accommodate the needs of different applications. Hence, a different focusing optic is often used for the same measurement of different samples, or for different measurements of the same sample. Using different optics is inefficient and uneconomical since changing the optical elements is a costly and time consuming drain on researchers, in particular, and industry, in general.

Optics with adjustable focal distances have been proposed. An example of such an optic is a traditional bending total reflection mirror. However, the alignment and adjustment of these mirrors are very time consuming and difficult to perform, and any imperfection in the alignment or adjustment of the optic degrades the system performance. Moreover, this approach is not generally applicable to multilayer optics, because of the inability of the variable bent multilayer mirrors to satisfy both the Bragg condition and geometric condition, which have to be satisfied simultaneously.

The reflective surfaces in the present invention are configured as multilayer or graded-d multilayer x-ray reflective surfaces. Multilayer structures only reflect x-ray radiation when Bragg's equation is satisfied:

$$n\lambda = 2d \sin \theta, \quad (1)$$

where
  n=the order of reflection
  λ=wavelength of the incident radiation
  d=layer-set spacing of a Bragg structure or the lattice spacing of a crystal
  θ=angle of incidence Multilayer or graded-d multilayer reflectors/mirrors are optics which utilize their inherent structure to reflect narrow band or monochromatic x-ray radiation. Multilayer structures generally comprise light element layers of relatively low electron density alternating with heavy element layers of relatively high electron density, both of which define the d-spacing of the multilayer. The bandwidth of the reflected x-ray radiation can be customized by manipulating the optical and multilayer parameters of the reflector. The d-spacing may be changed depthwise to control the bandpass of the multilayer mirror. The d-spacing of a multilayer mirror can also be tailored through lateral grading in such a way that the Bragg condition is satisfied at every point on a flat or curved multilayer reflector.

Curved multilayer reflectors, including parabolic, elliptical, and other aspherically shaped reflectors must satisfy Bragg's law to reflect a certain specific x-ray wavelength (also referred to in terms of energy or frequency). Bragg's law must be satisfied at every point on a curvature for a defined contour of such a reflecting mirror in order to maximize the intensity of the reflected x-ray radiation. Different reflecting surfaces require different d-spacing to reflect a specific x-ray wavelength. This means the d-spacing should be matched with the curvature of a reflector to satisfy Bragg's law such that the desired x-ray wavelength will be reflected. Since Bragg's law must be satisfied, the incident angle and d-spacing are normally fixed and thus the reflected or working wavelength is fixed.

Multilayer optics having an adjustable working wavelength are disclosed by Jiang et al. in U.S. Pat. No. 6,421,417, the entirety of which is hereby incorporated by reference. In one example, the wavelength of an optic may be adjusted by changing the curvature of the optic. In this case, a change in the curvature requires realignment of the optic. Therefore, such optics cannot be fully optimized for the best performance at the different wavelengths.

In single crystal diffraction, for example, monochromatic x-rays, usually of a single wavelength, produce a pattern of reflections which provides information about the crystal under analysis. More information about the crystal can be collected if x-rays of more than one wavelength are used. Accordingly, a multiple corner Kirkpatrick-Baez type x-ray optic assembly including at least two corners, each of which is configured to reflect a predetermined wavelength, may be used to analyze a sample. A single corner Kirkpatrick-Baez beam conditioning optic assembly is disclosed by Gutman et al. in U.S. Pat. No. 6,041,099, and a multiple corner Kirkpatrick-Baez beam conditioning optic assembly is disclosed by Gutman et al. in U.S. Pat. No. 6,014,423, the entireties of which are hereby incorporated by reference herein.

In a multiple corner optic assembly, for example, one corner may be configured to reflect x-rays of a first wavelength and another corner may be configured to reflect x-rays of a second x-ray wavelength. If an x-ray source with a particular target material selected to operate at the first wavelength irradiates the multiple corner optic assembly, the corner configured to reflect x-rays of the first wavelength will reflect radiation of the target characteristic emission line, or monochromatic radiation, and the second corner configured to reflect x-rays of the second wavelength will collect and reflect some portion of continuous radiation with a wavelength around its characteristic emission line, thus creating unwanted background radiation.

Thus, there is a need for a more efficient x-ray system which provides flexible optical solutions. In particular, there is a need to reduce the background radiation produced in x-ray systems comprising optic assemblies configured to reflect x-rays of more than one wavelength. Further, there is a need for an x-ray system capable of adjusting beam convergence or focal spot size in an x-ray system comprising a multiple corner optic assembly.

SUMMARY OF THE INVENTION

In satisfying the above need, as well as overcoming the enumerated drawbacks and other limitations of the related art, at least one embodiment of the present invention provides an x-ray optical system capable of conditioning x-rays of more than one wavelength as well as adjusting the convergence of an incident beam of x-rays or the optic focal spot size.

One embodiment of an x-ray optical system, in accordance with the teachings of the present invention, generally includes a multiple corner optic assembly including two or more single corner Kirkpatrick-Baez side-by-side optics positioned about an optical axis. Each single corner optic includes a first reflective surface and a second reflective surface orthogonal to the first reflective surface. The first and second reflective surfaces extend from an optic entrance zone to an optic exit zone. The single corner optics are positioned about the optical axis such that the reflective surfaces face the optical axis defining an inner surface of the optic assembly and the optic entrance and exit zones are respectively aligned, thus defining assembly entrance and exit zones. Each single corner optic is configured to condition an x-ray beam of a predetermined x-ray wavelength.

A first single corner optic of the plurality is configured to condition a first x-ray beam having a first x-ray wavelength. An adjustable aperture assembly is positioned at one of the assembly entrance and exit zone. The adjustable aperture assembly includes at least one movable body portion having an aperture formed therethrough. A first movable body portion is movable relative to the first single corner optic to adjust a size or shape of the first x-ray beam to at least one of: adjust optic focal spot size; adjust convergence of the first x-ray beam; and occlude the first x-ray beam having the first wavelength. Those skilled in the art will recognize that the terms "predetermined x-ray wavelength," "first x-ray wavelength," "second x-ray wavelength," etc., as used herein, should not be limited to only a single x-ray wavelength, but rather may include a wavelength range or bandwidth that the optic is configured to condition.

Another embodiment of an x-ray optical system, in accordance with the teachings of the present invention, generally includes a four corner optic having a substantially enclosed cylindrical configuration. The four corner optic includes an entrance and an exit zone and an optical axis. Each corner of the four corner optic is configured to condition an x-ray beam. An adjustable aperture assembly is positioned at one of the entrance and exit zones. The adjustable aperture assembly includes first and second movable blades movably coupled to one another to define an aperture. Each of the blades is movable in a first direction toward the optical axis and in a second direction away from the optical axis to adjust a size or shape of the aperture. The adjustable aperture assembly is configured to adjust optical focal spot size when positioned at the entrance zone and adjust convergence of the x-ray beams when positioned at the exit zone.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 4b is a front view of the multiple corner optic assembly of FIG. 4a;

FIGS. 5a-d are front views of an adjustable aperture assembly in accordance with further teachings of the present invention;

DETAILED DESCRIPTION

In accordance with the teachings of the present invention, an improved x-ray optical system incorporates a movable, i.e., adjustable, aperture assembly that enables a user to easily and effectively adjust the convergence of an incident beam of x-rays or the optic focal spot size. In doing so, the flux and resolution of the x-ray system can be optimized by using an optic having a high degree of convergence for a range of potential measurements, and then selecting a convergence for a particular measurement by adjusting the aperture. Thus, the flux and resolution are easily adjusted and optimized for the needs of different applications or measurements, and hence the efficiency of the overall optical system is increased.

In accordance with further teachings of the present invention, an improved x-ray optical system capable of adjusting beam convergence and optic focal spot size, as well as being capable of conditioning x-rays of different wavelengths while minimizing unwanted background radiation, is provided. The x-ray optical system incorporates at least one adjustable aperture assembly that enables a user to easily and effectively switch between reflective surfaces configured to reflect different wavelengths and simultaneously adjust the convergence of an incident beam of x-rays or adjust the optic focal spot size.

Figure 1:
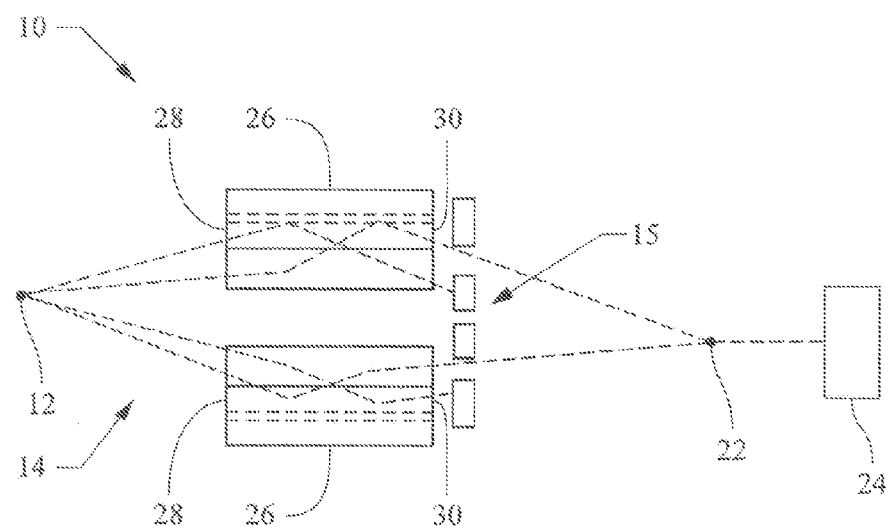
FIG. 1 is a schematic drawing of an x-ray optical system in accordance with the teachings of the present invention.

Referring to FIG. 1, there is shown an x-ray optical system 10 with an x-ray source 12, a multiple corner optic assembly 14 including a plurality of single corner Kirkpatrick-Baez side-by-side optics 26, an adjustable aperture assembly 15, a sample 22, and a detector 24. The x-ray source 12 can be a laboratory source, such as a high brilliance rotating anode x-ray generator or a microfocusing source. The multiple corner optic assembly 14 is comprised of a plurality of single corner Kirkpatrick-Baez side-by-side optics 26 positioned about an optical axis. While two single corner optics 26 can be viewed in FIG. 1, the multiple corner optic assembly 14 may include more than two single corner optics 26. Preferably, the multiple corner optic assembly 14 includes at least four single corner optics 26. For example, in FIG. 1, there may be at least another single corner optic behind each of the single corner optics 26 such that they are not visible in FIG. 1.

Figure 2A:
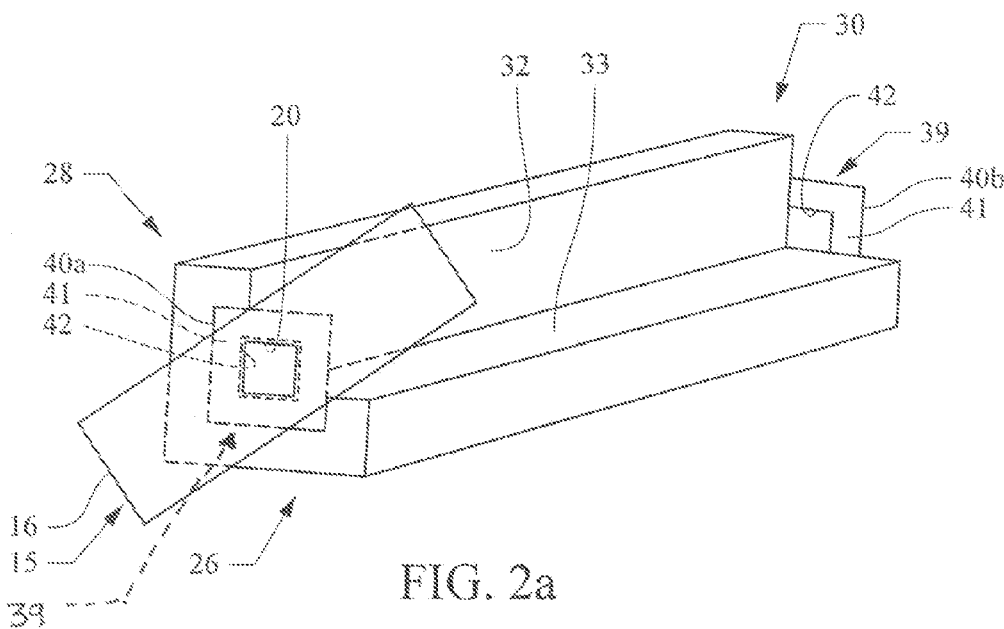
FIG. 2a is a perspective view of a single corner Kirkpatrick-Baez side-by-side optic of a multiple corner optic assembly.
Figure 2B:
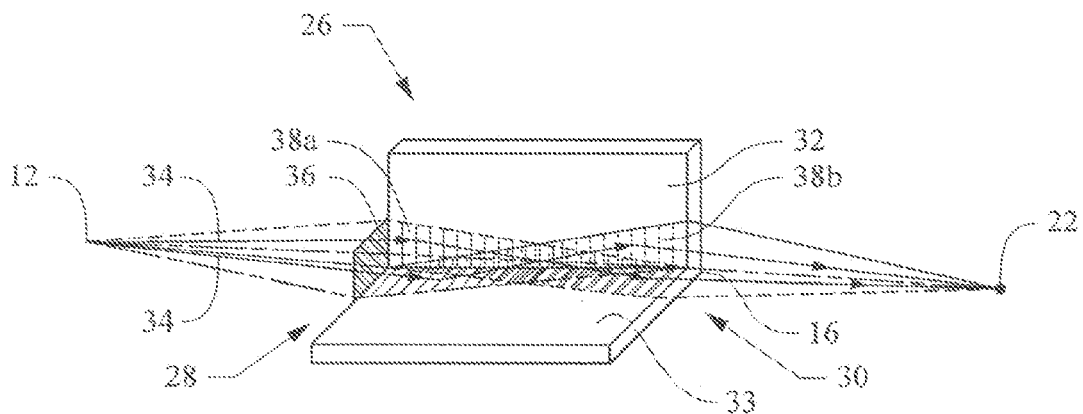
FIG. 2b is a diagrammatic view of a single corner Kirkpatrick-Baez side-by-side optic illustrating x-ray beam paths.

For illustration purposes, a single corner Kirkpatrick-Baez side-by-side optic 26 is shown by itself in FIG. 2a. As depicted in FIG. 2a, each single corner optic 26 of the multiple corner optic assembly 14 (FIG. 3a), in accordance with the teachings of the present invention, includes first and second orthogonal reflective surfaces 32 and 33 configured to reflect x-rays transmitted from the x-ray source 12. FIG. 2b illustrates incident and reflected x-ray beam paths with respect to the single corner optic 26. X-ray beams 34 are radiated from the x-ray source 12 and may be examined at the cross-section 36 of the x-ray beams. The cross-section 36 of the incident x-ray beams illustrates many divergent directions of the x-ray beams exiting the x-ray source 12. The incident x-ray beams 34 are reflected by working zone 38a and redirected to working zone 38b which lies generally upon the junction of reflective surfaces 32 and 33 opposite and partially overlapping working zone 38a. The x-ray beams 34 then exit the singer corner optic 26 and may be in a divergent, collimated or focused form depending upon the shapes of the reflective surfaces 32 and 33 and the form of the x-ray source 12.

Any combination of parabolic or elliptical mirror surfaces for the present invention may be used. For example, one of the reflecting surfaces 32 or 33 may have an elliptical surface and the other of the reflecting surfaces 32 or 33 may have a parabolic reflecting surface.

As previously discussed, the reflective surfaces or mirrors in the present invention are configured as multilayer or graded-d multi-layer Bragg x-ray reflective surfaces which reflect x-ray radiation when Bragg's equation, equation (1) above, is satisfied. Multilayer Bragg mirrors have a large reflection angle resulting in higher collection efficiencies for incident x-rays. These multilayered mirrors could increase the flux by more than an order of magnitude with a fine focus x-ray tube, as compared with total reflection mirrors. Multilayered mirrors, because of their monochromatic output, could also reduce the unwanted characteristic radiation during diffraction analysis by thousands of times.

Referring to FIG. 2a, a fixed aperture assembly 39 is placed at the entrance zone 28 and/or exit zone 30 of each optic 26 to eliminate coaxial direct x-rays, single bounce x-rays, or scattered x-rays. As illustrated in FIG. 2a, the fixed aperture assembly 39 includes a fixed aperture 40a, 40b positioned at each of the respective entrance 28 and exit zones 30 of the optic 26. Each fixed aperture 40a, 40b includes a body portion 41 fixedly coupled to the optic 26 and an aperture 42 formed through the body portion 41. The aperture 42 has a fixed shape preferably slightly larger than the working beam cross-section 36 of the incident x-ray beams 34. Further illustrated in FIG. 2a, and described in further detail below, is an adjustable aperture assembly 15 positioned at the entrance zone 28 of the optic 26 (i.e., between the source 12 and the fixed aperture 40a). The adjustable aperture assembly 15 may alternatively be positioned at the exit zone 30 of the optic 26 (i.e., between the fixed aperture 40b and the sample 22). The adjustable aperture assembly 15 includes a movable aperture 16 coupled to an actuator (not shown) which controls the movement of the movable aperture 16 relative to the optic 26.

Figure 3A:
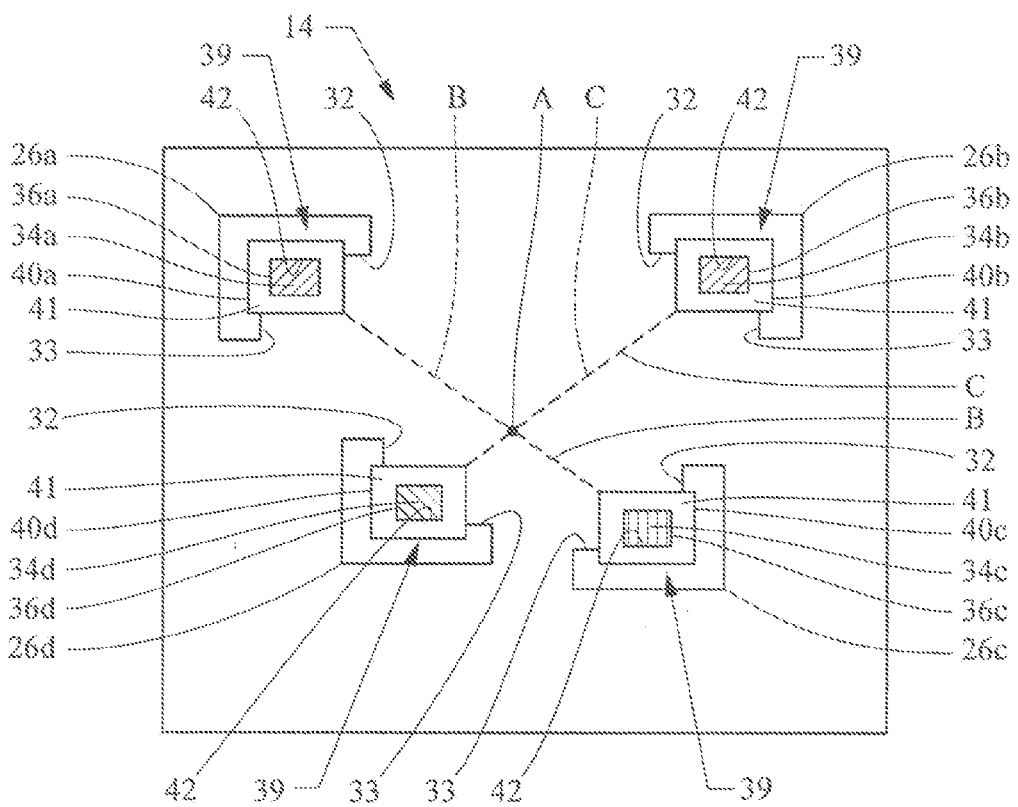
FIG. 3a is a front view of a multiple corner optic assembly.

Referring to FIGS. 3a-d, a plurality of single-corner Kirkpatrick-Baez side-by-side optics 26a-d make up the multiple corner optic assembly 14. In this embodiment, the multiple corner optic assembly 14 is non-symmetric, that is not all of the single corner optics 26a-d are equidistantly positioned about an optical axis A of the multiple corner optic assembly 14. As illustrated in FIG. 3a, the optical axis A of the multiple corner optic assembly 14 is the point of intersection of line B (i.e., the line of symmetry for optics 26a and 26c) and line C (i.e., the line of symmetry for optics 26b and 26d). The single corner optics 26a-d are positioned about the optical axis A such that first and second reflective surfaces 32 and 33 of each optic 26a-d face the optical axis A. In this embodiment, all of the single corner optics 26a-d have the same optic length. The single corner optics 26a-d are positioned about the optical axis A such that their respective entrance zones and exit zones are aligned, thus defining one common entrance zone and one common exit zone of the multiple corner optic assembly 14.

As illustrated in FIGS. 3a-d, the multiple corner optic assembly 14 includes a fixed aperture assembly 39 positioned at the entrance and/or exit zone of the multiple corner optic assembly 14. The view taken in FIGS. 3a-d can be from either the entrance zone or the exit zone of the optic assembly 14. Preferably, the optic assembly 14 includes a fixed aperture assembly 39 at each of the entrance and exit zones. As best illustrated in FIG. 3a, the fixed aperture assembly 39 includes fixed apertures 40a-d coupled to each of the respective single corner optics 26a-d. The fixed apertures 40a-d include body portions 41 fixedly coupled to the optics 26a-d and an aperture 42 formed through each body portion 41. As stated previously, the aperture 42 is preferably slightly larger than the working beam cross-sections 36a-d associated with each respective single corner optic 26a-d. The fixed apertures 40a-d are capable of blocking direct, single reflected, and scatter beams.

The cross-sections 36a-d of x-ray beams 34a-d, respectively, are shown as they are seen through the fixed apertures 40. In this embodiment, the multiple corner optic assembly 14 is capable of conditioning x-rays of more than one wavelength. For example, x-ray beam 34a and 34b have the same first wavelength and x-ray beams 34c and 34d have second and third wavelengths, respectively, each of which is different than the first wavelength. The different cross-hatching of the cross-sections 36a-d in FIG. 3a is used to identify the different wavelengths. One of ordinary skill in the art would recognize that the x-ray beam entering the system differs from the x-ray beam leaving the system.

Figure 3B:
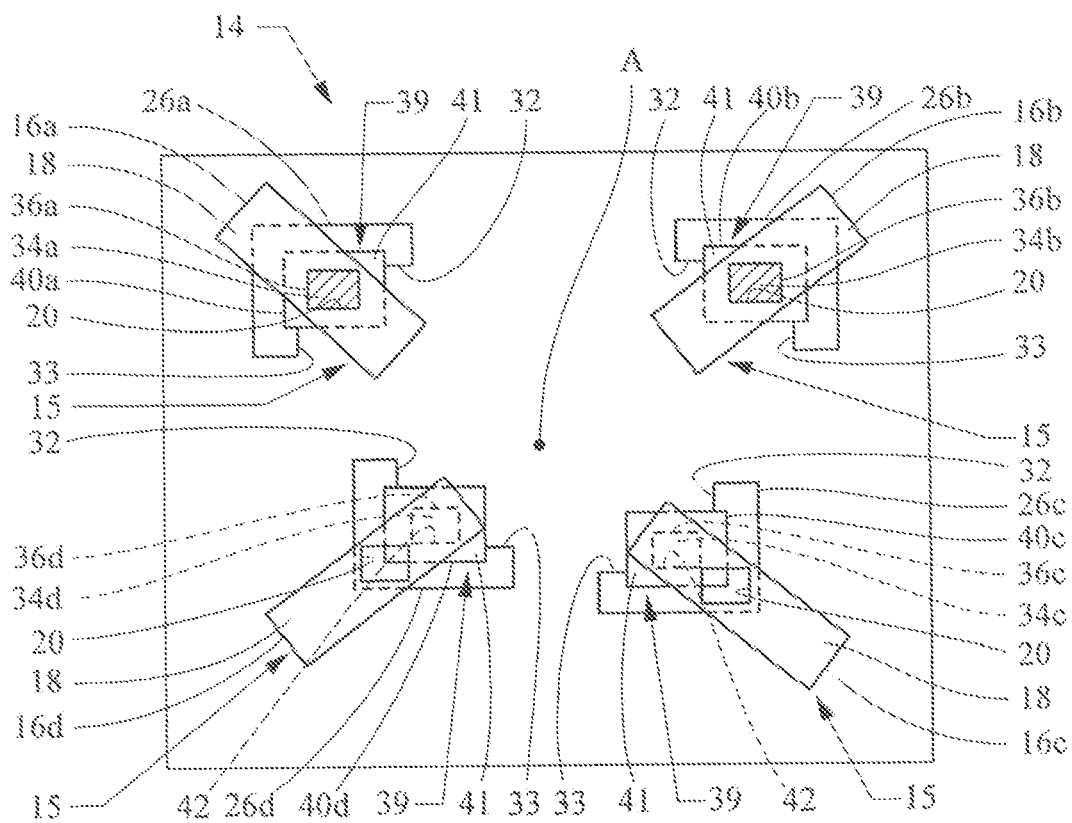
FIGS. 3b-d are front views of the multiple corner optic assembly of FIG. 3a, shown with an adjustable aperture assembly in accordance with the teachings of the present invention.
Figure 3C:
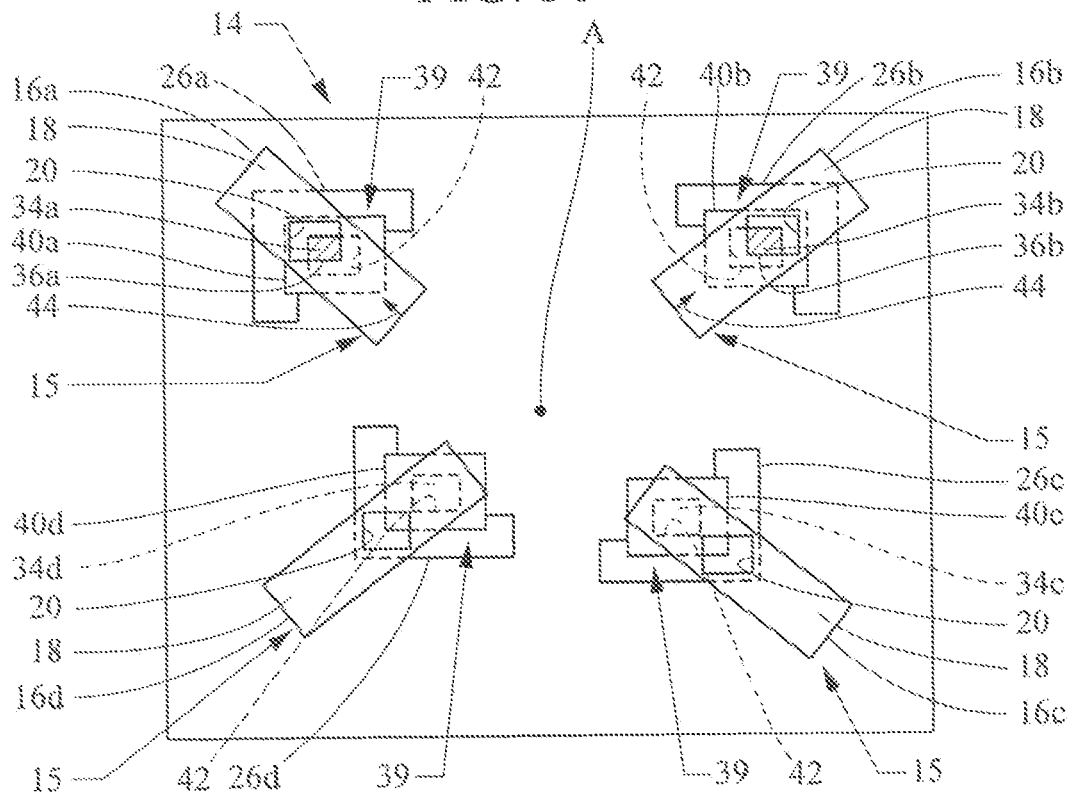
Figure 3D:
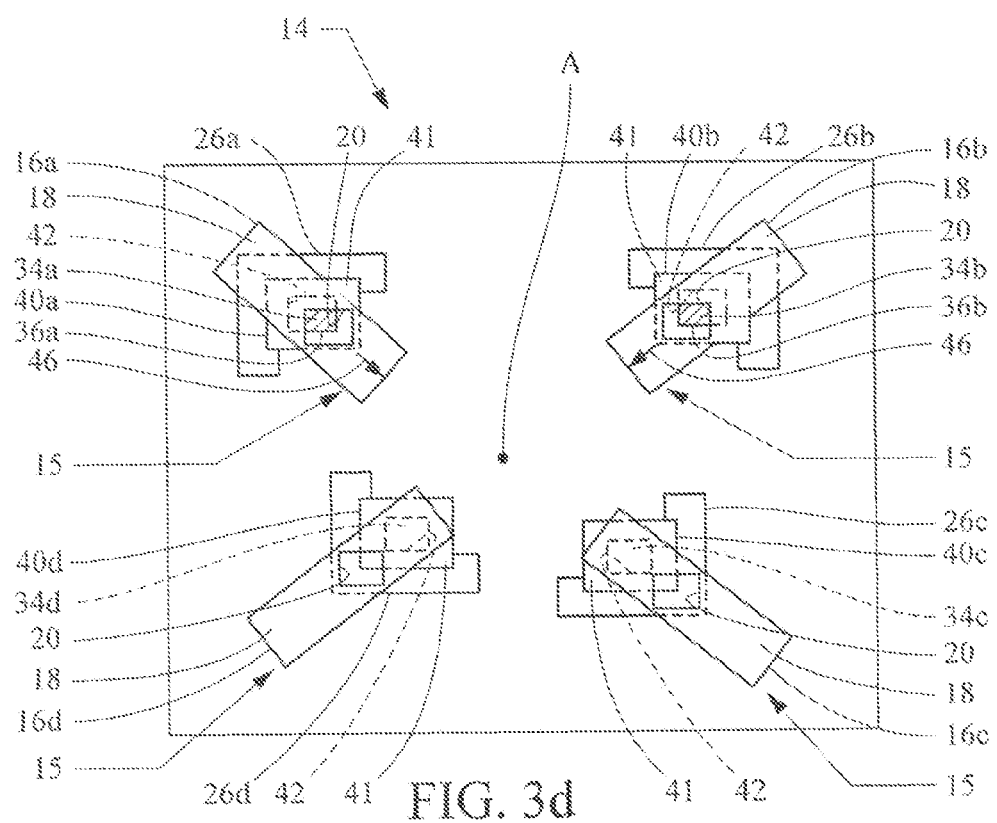

Referring to FIGS. 3b-d, an adjustable aperture assembly 15 is positioned over the fixed aperture assembly 39. Like the fixed aperture assembly, the adjustable aperture assembly 15 may be positioned at the assembly entrance zone and/or exit zone. The adjustable aperture assembly 15 includes movable apertures 16a-d associated with each of the single corner optics 26a-d, respectively. If the adjustable aperture assembly 15 is positioned at the entrance zone of the optic assembly 14, the movable apertures 16a-d are positioned between the x-ray source 12 and the fixed apertures 40a-d coupled to the optics 26a-d at entrance zone of the respective optics 26a-d. If the adjustable aperture assembly 15 is positioned at the exit zone of the optic assembly 14, the movable apertures 16a-d are positioned between the fixed apertures 40a-d coupled to the optics 26a-d at the exit zone of the respective optics 26a-d and the sample 22.

Each movable aperture 16a-d includes a movable body portion 18 and an aperture 20 formed therethrough. Each aperture 20 is fixed in its shape and size, but adjustable in terms of its position via the movable body portion 18. Preferably, the apertures 20 are similar in shape to the apertures 42 of the fixed apertures 40a-d. As illustrated in FIGS. 3b-d, the apertures 20 and 42 are generally rectangular in shape. However, the shape of the apertures 20 and 42 can be modified to provide any desired shape for the resultant passageway. The apertures 20 and 42 of the respective movable apertures 16a, 16b and fixed apertures 40a, 40b are shown coincident with one another in FIG. 3b. In this embodiment, the movable apertures 16a-d are independently movable or adjustable relative to the respective optics 26a-d. Preferably, the movable apertures 16a-d are moved by an actuator and motor (not shown) coupled to the body portion 18 of each movable aperture 16a-d. The movable apertures 16a-d may be independently moved by any other suitable means.

The movable apertures 16a-d provide a means for conditioning x-rays of one wavelength while preventing unwanted background radiation from x-rays of another wavelength. As shown in FIGS. 3b-d, the movable apertures 16a and 16b associated with the x-ray beams 34a and 34b, respectively, are shown in the open beam state (FIG. 3b) and partially open or partially closed beam states (FIGS. 3c-d) and the movable apertures 16c and 16d associated with the x-ray beams 34c and 34d, respectively, are shown in the closed beam state. As illustrated in FIG. 3b, in the open beam state, the movable apertures 16a and 16b are positioned relative to respective optics 26a and 26b such that the apertures 20 are aligned with the apertures 42 of the corresponding fixed apertures 40a and 40b, and thus aligned with the x-ray beam cross-sections 36a and 36b, respectively, to provide a clear radiation path for the x-rays of the first wavelength.

Thus, in the open beam state, the movable body portions 18 are positioned such that the fixed shape apertures 20 are positioned over, or aligned with, the x-ray beam cross sections 36 so as to maximize the size of the x-ray beam cross-sections 36. In the closed beam state, the movable apertures 16c and 16d are positioned relative to respective optics 26c and 26d such that the apertures 20 are not aligned with and do not overlap the apertures 42 of the corresponding fixed apertures 40c and 40d, and thus are not aligned with the x-ray beam cross sections 36c and 36d, respectively. Rather, the body portions 18 are positioned to block the radiation path for the x-rays of the second and third wavelengths to prevent unwanted radiation from the second and third wavelengths during conditioning of x-rays of the first wavelength.

In this embodiment, each movable aperture 16a-d is movable between an open beam state and a closed beam state for its corresponding x-ray beam 34a-d. Any position of the movable apertures 16a-d between the open and closed beam states may be referred to as a partially open or a partially closed beam state. In addition to switching between x-rays of differing wavelengths, by opening or closing the working section of the multiple corner optic assembly 14, the movable apertures 16a-d are capable of adjusting x-ray beam convergence or optic focal spot size.

For example, the movable apertures 16a-d are movable from the open beam state in a first direction 44 (FIG. 3c) away from the optical axis A of the multiple corner optic assembly 14 and in a second direction 46 (FIG. 3d) toward the optical axis A of the multiple corner optic assembly 14. If the movable apertures 16a-d are placed at the entrance zone of the optic assembly 14, moving the apertures 16a-d in the first direction 44 away from the optical axis A reduces x-ray beam convergence and moving the movable apertures 16a-d in the second direction 46 toward the optical axis A reduces optic focal spot size. Alternatively, if the movable apertures 16a-d are placed at the exit zone of the optic assembly 14, moving the movable apertures 16a-d in the first direction 44 away from the optical axis A reduces optic focal spot size and moving the movable apertures 16a-d in the second direction 46 toward the optical axis A reduces x-ray beam convergence.

Referring to FIG. 3c, the movable apertures 16c and 16d are in the closed beam state and the movable apertures 16a and 16b have moved from the open beam state of FIG. 3b to a partially open or partially closed beam state. Accordingly, in this embodiment, x-rays of the first wavelength are conditioned while x-rays of the second and third wavelengths are occluded. In FIG. 3c, movable apertures 16a and 16b are moved in the direction of arrow 44 away from the optical axis A of the multiple corner optic assembly 14. Thus, if positioned at the entrance zone of the optic assembly 14, the movable apertures 16a and 16b effectively reduce beam convergence of x-ray beams 34a and 34b. Conversely, if positioned at the exit zone of the optic assembly 14, the movable apertures 16a and 16b effectively reduce optic focal spot size.

Referring now to FIG. 3d, the movable apertures 16c and 16d are in the closed beam state and the movable apertures 16a and 16b have moved from the open beam state of FIG. 3b to a partially open or partially closed beam state. Accordingly, in this embodiment, x-rays of the first wavelength are conditioned while x-rays of the second and third wavelengths are occluded. In FIG. 3d, the movable apertures 16a and 16b are moved in the direction of arrow 46 toward the optical axis A of the multiple corner optic assembly 14. Thus, if positioned at the entrance zone of the optic assembly 14, the movable apertures 16a and 16b effectively reduce optic focal spot size. Conversely, if positioned at the exit zone of the optic assembly 14, the movable apertures 16a and 16b effectively reduce beam convergence of x-ray beams 34a and 34b.

Figure 4A:
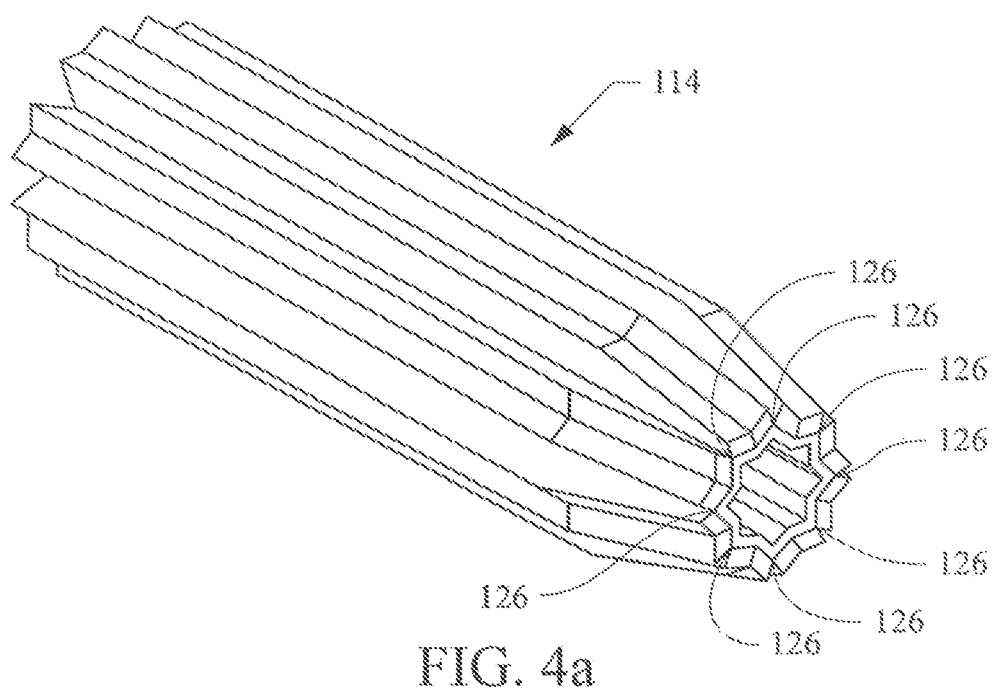
FIG. 4a is a side perspective view of a multiple corner optic assembly.
Figure 4B:
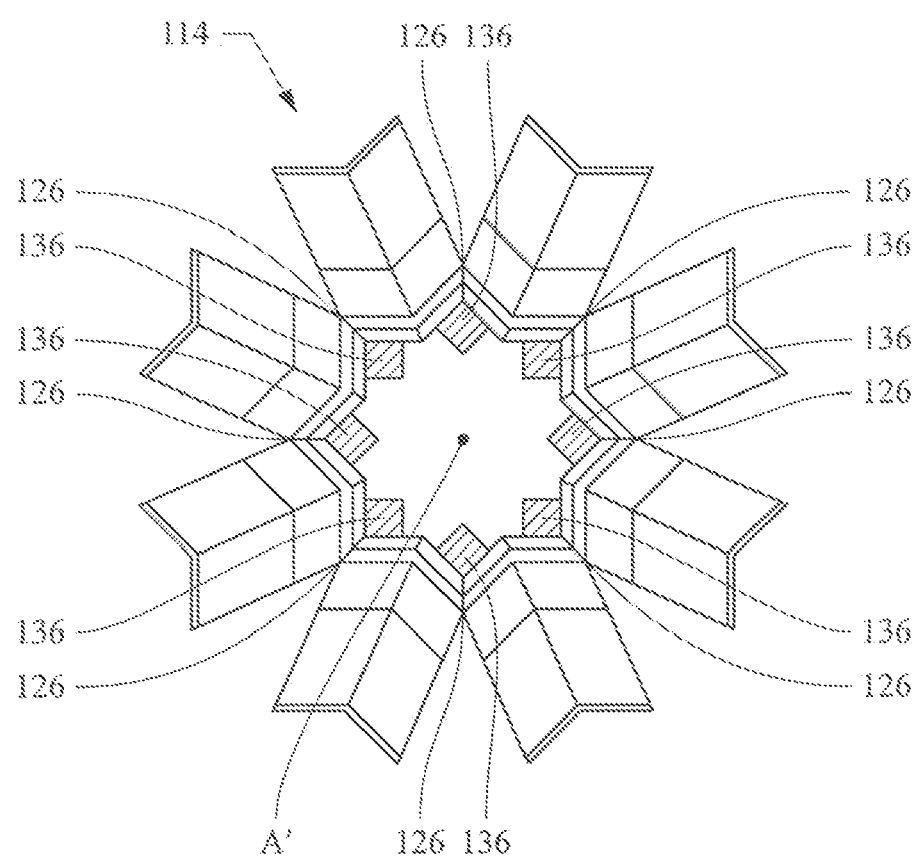
Figure 4C:
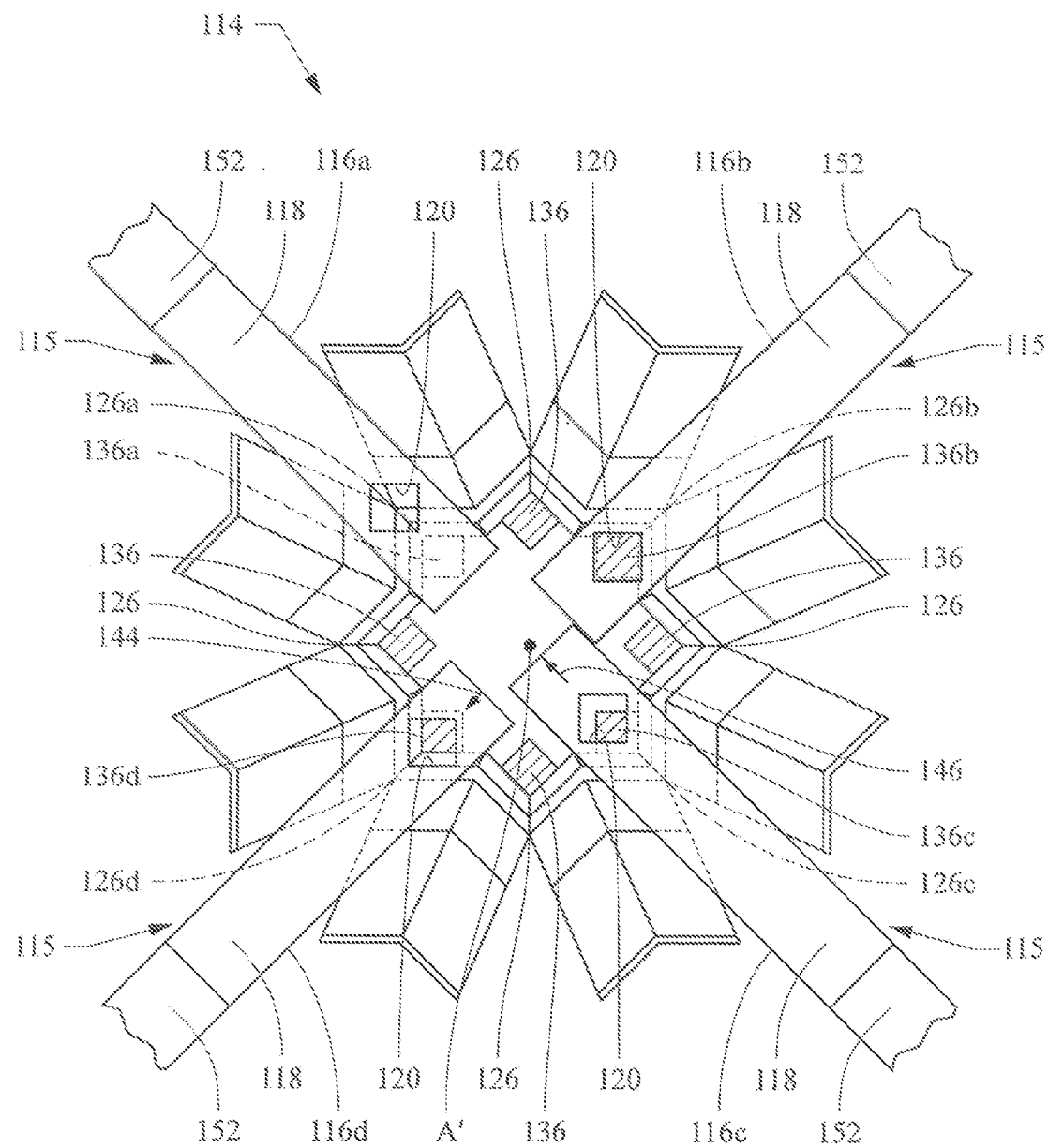
FIG. 4c is a front view of the multiple corner optic assembly of FIG. 4a, shown with an adjustable aperture assembly in accordance with teachings of the present invention.

FIGS. 4a-c illustrate an embodiment of the invention having a description similar to that of FIGS. 3a-d and in which similar components are denoted by similar reference numerals increased by 100. As illustrated, the multiple corner optic assembly 114 includes eight single corner optics 126 coupled together. In this embodiment, the optic assembly 114 is symmetric, that is the single corner optics 126 are equidistantly arranged about an optical axis A' of rotational symmetry such that the multiple corner optic assembly 114 defines a symmetric shape at the entrance and exit zones.

A fixed aperture assembly (not shown) is preferably positioned at both the entrance and exit zones of the optic assembly 114 such that each single corner optic 126 is associated with its own fixed aperture (not shown) as in the embodiment of FIGS. 3a-d. Alternatively, rather than having a fixed aperture for each optic 126, and thus a fixed body portion coupled to each corner of the multiple corner optic assembly 114, the fixed aperture assembly may include a number of fixed body portions that is less than the number of single corner optics 126, or corners, of the optic assembly 114. For example, one fixed body portion having eight apertures formed therethrough may be positioned at the assembly entrance and/or exit zones such that the apertures are appropriately aligned with each of the optic assembly corners 126 and capable of blocking direct, single reflected and scatter beams.

FIG. 4b is a front view of the multiple corner optic assembly 114 of FIG. 4a, radiationally coupled with an x-ray source (not shown) and shown with x-ray beam cross sections 136 as they are seen through fixed apertures (not shown). In FIG. 4c, an adjustable aperture assembly 115 in accordance with the teachings of the present invention is positioned over the fixed aperture assembly (not shown) at the entrance zone and/or exit zone of the optic assembly 114. Accordingly, it will be recognized by those skilled in the art that the view taken in FIGS. 4b-c can be from either the entrance zone or the exit zone of the optic assembly 114.

Referring to FIG. 4c, the adjustable aperture assembly 115 includes a movable aperture associated with each corner 126, however, for clarity purposes, only movable apertures 116a-d associated with corners 126a-d, respectively, are shown. So that the movable apertures 116a-d do not interfere with one another when they are moved toward the optical axis A', the movable apertures 116a-d may be positioned in different parallel planes, each of which is parallel to planes defined by the assembly entrance and exit zones, such that one movable aperture 116a-d may slide over the top of another movable aperture 116a-d instead of hitting each other head-on when approaching the optical axis A' of the optic assembly 114.

While the cross-hatchings of the x-ray beam cross sections 136 in FIG. 4b-c are the same, the multiple corner optic assembly 114 is capable of conditioning x-rays of various wavelengths like the embodiment of FIGS. 3a-d, wherein one of the single corner optics 126 of the multiple corner optic assembly 114 may be configured to condition x-ray wavelengths of a first wavelength and a second single corner optic 126 of the multiple corner optic assembly 114 may be configured to condition x-rays of a second wavelength different from the first wavelength. Accordingly, similar to the embodiment of FIG. 3a-d, the adjustable aperture assembly 115 of the multiple corner optic assembly 114 is capable of switching between x-rays of different wavelengths as well as adjusting x-ray beam convergence of optic focal spot size in accordance with the teachings of the present invention.

As shown in FIG. 4c, the movable aperture 116a is in a closed beam state as the body portion 118 is completely blocking the x-ray beam cross section 136a. The movable aperture 116b is in an open beam state as the body portion 118 is positioned such that the aperture 120 is aligned with the aperture of the fixed aperture (not shown), and thus aligned with the x-ray beam cross section 136b (i.e., the body portion 118 is not blocking the x-ray beam cross section 136b). The movable apertures 116c and 116d are in partially open or partially closed beam states as the apertures 120 are not completely aligned with the apertures of the corresponding fixed apertures (not shown), and thus not completely aligned with the x-ray beam cross sections 136c and 136d (i.e., the body portions 118 are at least partially blocking the x-ray beam cross sections 136c and 136d).

In FIG. 4c, the movable aperture 116c has moved from an open beam state in a direction 146 toward the optical axis A'. Thus, if the adjustable aperture assembly 115 is positioned at the entrance zone of the multiple corner optic assembly 114, the movable aperture 116c functions to reduce optic focal spot size, but if positioned at the exit zone of the multiple corner optic assembly 114, the movable aperture 116c functions to reduce x-ray beam convergence. The movable aperture 116d has moved from an open beam state in a direction 44 away from the optical axis A'. Thus, if the adjustable aperture assembly 115 is positioned at the entrance zone of the multiple corner optic assembly 114, the movable aperture 116d functions to reduce x-ray beam convergence, but if positioned at the exit zone of the multiple corner optic assembly 114, the movable aperture 116d functions to reduce optic focal spot size.

As illustrated in FIG. 4c, an actuator 152 is coupled to the body portion 118 of each movable aperture 116a-d to facilitate movement of the movable apertures 116a-d between the open beam state and the closed beam state. The actuator 152 is preferably coupled with a motor. The movable apertures 116a-d may be independently moved by any other suitable means.

In accordance with further teachings of the present invention, a movable aperture 116a-d may be associated with more than one single corner optic 126, or corner, of the multiple corner optic assembly 114. Thus, the number of movable apertures 116a-d within the adjustable aperture assembly 115 may be less than the number of corners 126 of the multiple corner optic assembly 114. FIGS. 5a-d illustrate an example of a movable aperture 216 associated with more than one single corner optic 126, or corner, of a multiple corner optic assembly 114 in accordance with the teachings of the present invention. In this example, x-ray beam cross sections 136b and 136d of opposing corners 126b and 126d, respectively, of the multiple corner optic assembly 114 of FIG. 4b, are illustrated. For illustration purposes, the entire multiple corner optic assembly 114 is not shown in FIGS. 5a-d, only corners 126b and 126d, corresponding beam cross sections 136b and 136d, and the movable aperture 216 are depicted. Instead of using two separate movable apertures for opposing corners 126b and 126d, such as movable apertures 116b and 116d in FIG. 4c, one movable aperture 216, including one or more openings or apertures 220a-b capable of moving the apertures 220a-b back and forth in a direction toward the optical axis A' and in a direction away from the optical axis A', may be used to open and close the radiation paths for the corners 126b and 126d.

As illustrated in FIGS. 5a-d, the movable aperture 216 includes a body portion 218 and two apertures 220a and 220b formed therethrough configured to adjust the performance of the x-ray beams 134d and 134b (shown as they are seen through a fixed aperture (not shown)) of respective corners 126d and 126b. In FIG. 5b, the movable aperture 216 is positioned such that both the x-ray beams 134d and 134b are in the open beam state, i.e., in which the apertures 220a and 220b are aligned with the x-ray beam cross sections 136d and 136b so as to maximize the size of the x-ray beam cross sections 136d and 136b, and wherein the body portion 218 is not blocking any portion of the x-ray beam cross sections 136d and 136b.

In FIG. 5c, the movable aperture 216 is positioned such that the x-ray beam 134d is in the open beam state and the x-ray beam 134b is in the closed beam state. In this position, the aperture 220a is aligned with the x-ray beam cross section 136d and the body portion 218 is not blocking the x-ray beam cross section 136d so as to maximize the size of the x-ray beam cross section 136d; whereas, the aperture 220b is not aligned with the x-ray beam cross section 136b and the body portion 218 is blocking the x-ray beam cross section 136b so as to minimize the size of the x-ray beam cross section 136b. Thus, if the x-ray beams 134d and 134b are of different wavelengths, the movable aperture 216 is capable of conditioning x-rays of one wavelength while occluding x-rays of another wavelength.

In FIG. 5d, the movable aperture is positioned such that the x-ray beam 134d is in a closed beam state and the x-ray beam 134b is in a partially open or partially closed beam state. In this position, the aperture 220a is not aligned with the x-ray beam cross section 136d and the body portion 218 is blocking the x-ray beam cross section 136d; whereas the aperture 220b is partially aligned with the x-ray beam cross section 136b such that the body portion 218 is blocking a portion of the x-ray beam cross section 136b. Thus, the radiation path for the x-ray beam 134d is blocked while the x-ray beam 134b is conditioned. With respect to the x-ray beam 134b being conditioned, the aperture 220b of the movable aperture 216 has moved in a direction 146 toward the optical axis A'. Thus, if the movable aperture 216 is positioned at the entrance zone of the optic assembly 114, the aperture 220b of the movable aperture 216 effectively reduces optic focal spot size. Conversely, if the movable aperture 216 is positioned at the exit zone of the optic assembly 14, the aperture 220b of the movable aperture 216 effectively reduces beam convergence of the x-ray beam 134b.

Similarly, it will be recognized by those skilled in the art that the movable aperture 216 is movable to a position in which the x-ray beam 134b is in a closed beam state and the x-ray beam 134d is in a partially open or partially closed beam state, wherein the aperture 220a effectively conditions the x-ray beam 134d, either reducing optic focal spot size or reducing the beam convergence of the x-ray beam 134d.

Whether the aperture 220a reduces optic focal spot size or reduces the beam convergence of the x-ray beam 134d is dependent upon the direction the aperture 220a moves relative to the optical axis A' (i.e., toward the optical axis A' or away from the optical axis A') and upon the positioning of the movable aperture 216 relative to the optic assembly 114 (i.e., at the entrance zone or the exit zone of the optic assembly 114). The apertures 220a and 220b are fixed in shape, but movable, i.e., adjustable, in position. As illustrated, the apertures 220a and 220b are hexagonal in shape and sized to have a length $L_2$ about twice the length $L_1$ of the corresponding x-ray beam cross section 136. However, the shape of the apertures 220a and 220b can be modified to provide any desired shape for the resultant passageway.

Accordingly, FIGS. 3a-d (and FIGS. 4a-c and FIGS. 5a-d) illustrates a method of reducing background radiation in an x-ray system 10 comprising an optic assembly 14 configured to reflect x-rays of more than one wavelength. This is accomplished by providing a multiple corner optic assembly 14 configured to condition x-rays of more than one wavelength and a movable, i.e., adjustable, aperture assembly 15 in accordance with the teachings of the present invention. The movable aperture assembly 15 is adjusted so that the radiation path for x-rays of a first wavelength is occluded and the radiation path for x-rays of a second wavelength is left open, thereby reducing the background radiation produced from x-rays of the first wavelength.

Further, FIGS. 3a-d (and FIGS. 4a-c and FIGS. 5a-d) illustrates a method of adjusting x-ray beam convergence and optic focal spot size in an x-ray system 10 including a multiple corner optic assembly 14 and a movable, i.e., adjustable, aperture assembly 15 including adjustable apertures 16 having movable body portions 18 and apertures 20 formed therethrough. In one example, the adjustable aperture assembly 15 is positioned at the optic assembly entrance zone. In this example, adjusting a movable body portion 18 such that the aperture 20 of the movable body portion 18 moves with respect to a corner or optic 26 of the optic assembly 14 from an open beam state in a direction toward the optical axis A of the optic assembly 14 effectively adjusts optic focal spot size. Alternatively, adjusting a movable body portion 18 such that the aperture 20 of the movable body portion 18 moves with respect to a corner or optic 26 of the optic assembly 14 from an open beam state in a direction away from the optical axis A of the optic assembly 14 effectively adjusts x-ray beam convergence.

In another example, the adjustable aperture assembly 15 is positioned at the optic assembly exit zone. In this example, adjusting a movable body portion 18 such that the aperture 20 of the movable body portion 18 moves with respect to a corner or optic 26 of the optic assembly 14 form an open beam state in a direction toward the optical axis A of the optic assembly 14 effectively adjusts x-ray beam convergence. Alternatively, adjusting a movable body portion 18 such that the aperture 20 of the movable body portion 18 moves with respect to a corner or optic 26 of the optic assembly 14 form an open beam state in a direction away from the optical axis A of the optic assembly 14 effectively adjusts optic focal spot size.

Figure 6A:
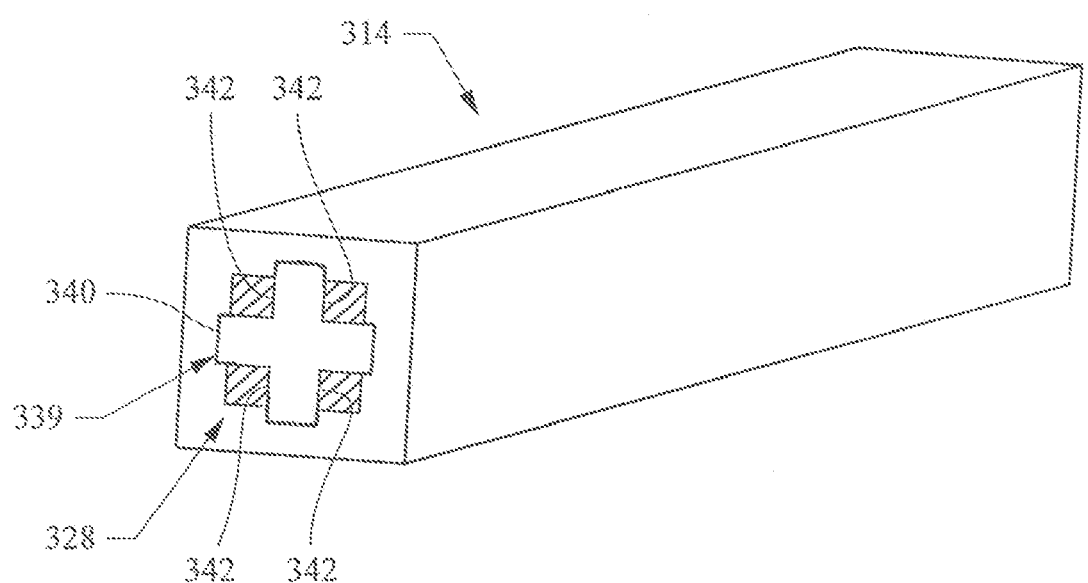
FIG. 6a is a perspective view of a four corner optic assembly.
Figure 6B:
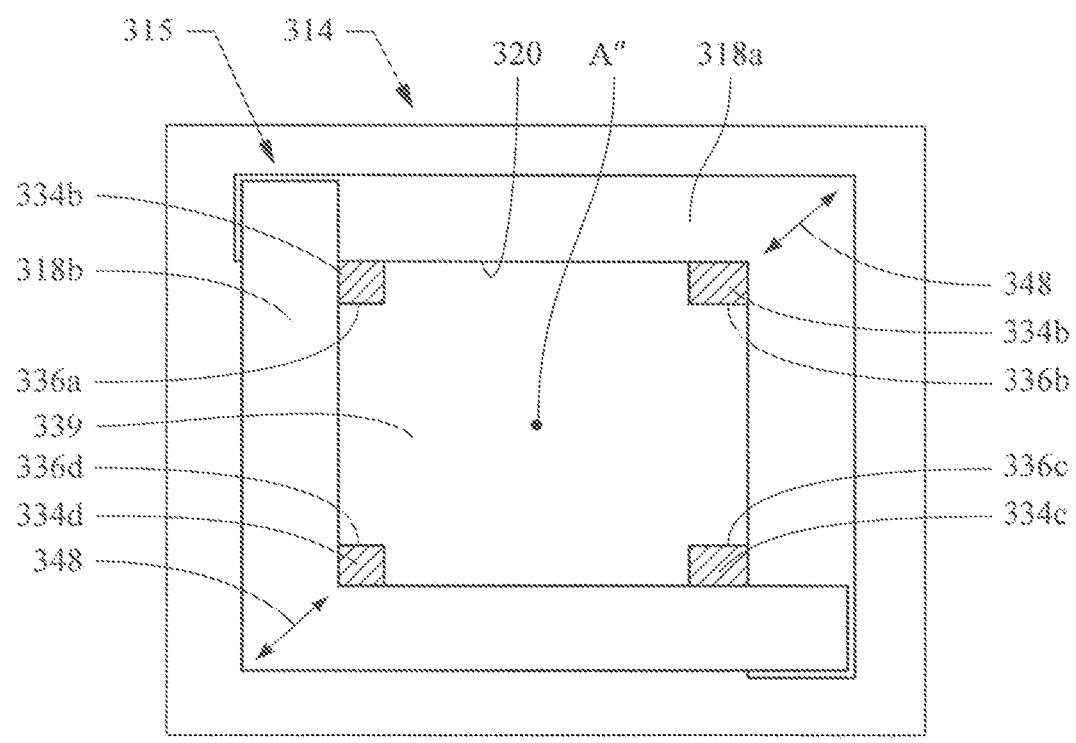
FIG. 6b is a front view of the optic assembly of FIG. 6a, shown with an adjustable aperture assembly in accordance with further teachings of the present invention.

Referring to FIG. 6a, a movable, i.e., adjustable, aperture assembly 315 is provided for a symmetric four corner optic assembly 314, such as the four corner optic known and described in U.S. Pat. No. 6,014,423 and illustrated in FIG. 6a. As shown in FIG. 6a, a fixed aperture assembly 339 may be placed at the entrance zone 328, exit zone (not shown), or both. The fixed aperture assembly 339 can eliminate certain frequency bands of unwanted x-ray beams that will not converge to the focal point of the optic assembly 314. In this embodiment, the fixed aperture assembly 339 includes a fixed aperture 340 including entrance apertures 342 which are configured to allow the passage of x-rays that will or have been reflected in two dimensions. FIG. 6b depicts the x-ray beam cross sections 336a-d of x-ray beams 334a-d, respectively, as they are seen through the fixed aperture 340 of FIG. 6a. In this embodiment, the x-ray beams 334a-b are of the same wavelength, denoted by similar cross-hatching.

As illustrated in FIG. 6b, the adjustable aperture assembly 315 is positioned over the fixed aperture assembly 339 at the entrance zone, exit zone, or both. The adjustable aperture assembly 315 is double-bladed and includes two movable L-shaped blades 318a and 318b movably coupled together to define an opening or aperture 320. The passageway defined by the aperture 320 is generally rectangular or square in shape. However, the shape of the blades 318a and 318b can be modified to provide any desired shape for the resultant passageway. In this embodiment, the aperture 320 is adjustable in its shape and size rather than its position. The adjustable aperture assembly 316 can be located in close proximity to the optic assembly 314 and therefore does not have to be attached to the optic assembly 314.

In FIG. 6b, the blades 318a and 318b are partially blocking the x-ray beam cross sections 336a-d. The blades 318a and 318b are movable in the direction of arrow 348, both toward the optical axis A" and away from the optical axis A" of the optic assembly 314. The adjustable aperture assembly 315 may be positioned at the exit zone of the optic assembly 314, in which synchronous movement of the blades 318a and 318b in the direction of arrow 348 adjusts the convergence of the x-ray beams 334a-d. This is important in applications such as single crystal diffraction where beam convergence is a critical feature.

Alternatively, the adjustable aperture assembly 315 may be positioned at the entrance zone of the optic assembly 314. In this embodiment, synchronous movement of the blades 318a and 318b in the direction of arrow 348 adjusts the optic focal spot size. This is important in applications such as x-ray microfluorescence where parameters such as flux and focal spot size are important. Thus, by positioning the adjustable aperture assembly 315 at the entrance zone of the optic assembly or four corner optic 314, the adjustable aperture assembly 315 adjusts the size of the beam that hits the reflective surfaces of the four corner optic 314. Accordingly, the length of the reflective surfaces of the optic assembly 314 is varied because the beam size determines how much of the reflective surfaces are hit by the beam. Hence, adjusting the size of the aperture 320 by moving the blades 318a and 318b in the direction of arrow 348 either shortens (by moving the blades 318a and 318b in a direction toward the optical axis A" of the optic assembly 314) or lengthens (by moving the blades 318a and 318b in a direction away from the optical axis A" of the optic assembly 314) the length of the optic assembly or four corner optic 314 to be radiated and consequently affects the flux and the focal spot size.

For example, a larger aperture 320, and thus a longer four corner optic 314, gives higher flux and a larger focal spot. On the other hand, if the working length of the four corner optic 314 is shortened, by reducing the size of the aperture 320, the flux drops, but the focal spot size is reduced. Thus, the adjustable aperture assembly 315 provides a means of optimizing a particular parameter by adjusting the working length of the four corner optic 314.

Figure 7:
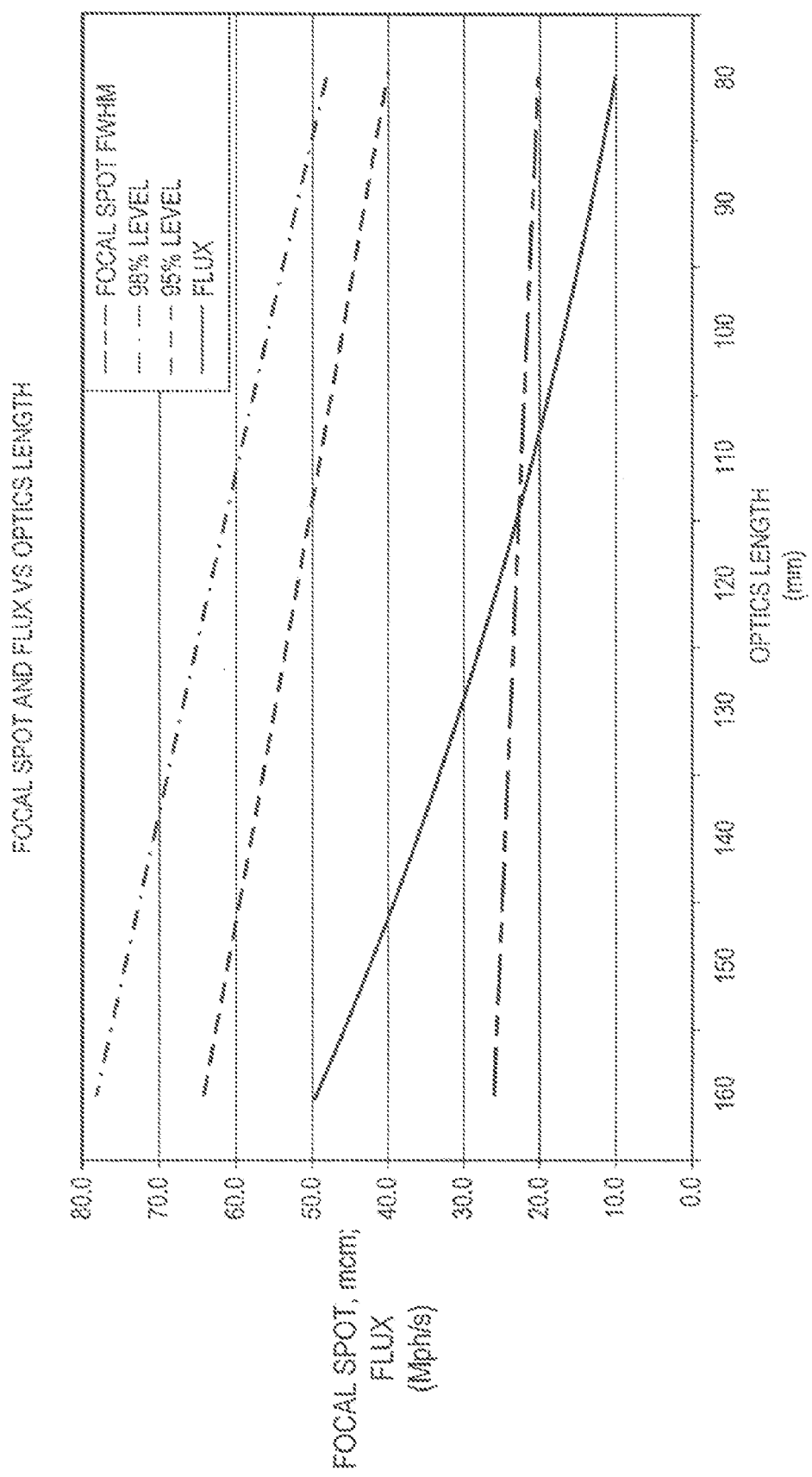
FIG. 7 is a plot showing focal spot size and flux as a function of optic length.

The optic focal spot size, i.e., the smallest beam cross section of the conditioned beam is a critical parameter in many micro-XRF applications. It is important that the primary beam does not hit and excite any area outside the area of interest. Any fluorescent signal coming from the outside may add artificial data to the real data of interest. The contribution to the total fluorescence from outside the area of interest should be controlled below a certain specified level. FIG. 7 shows how the trade-off between flux and optic focal spot size could be conveniently adjusted with the proposed adjustable aperture. By adjusting the opening of the aperture, one can alter the length of the optic which contributes to the output beam, which changes the Full Width at Half Maximum (FWHM), full width at 95% level, full width at 98% level, and total flux. Since a specific focal spot size is often mandatory for certain measurements or applications, the loss of flux is considered acceptable.

Figure 8:
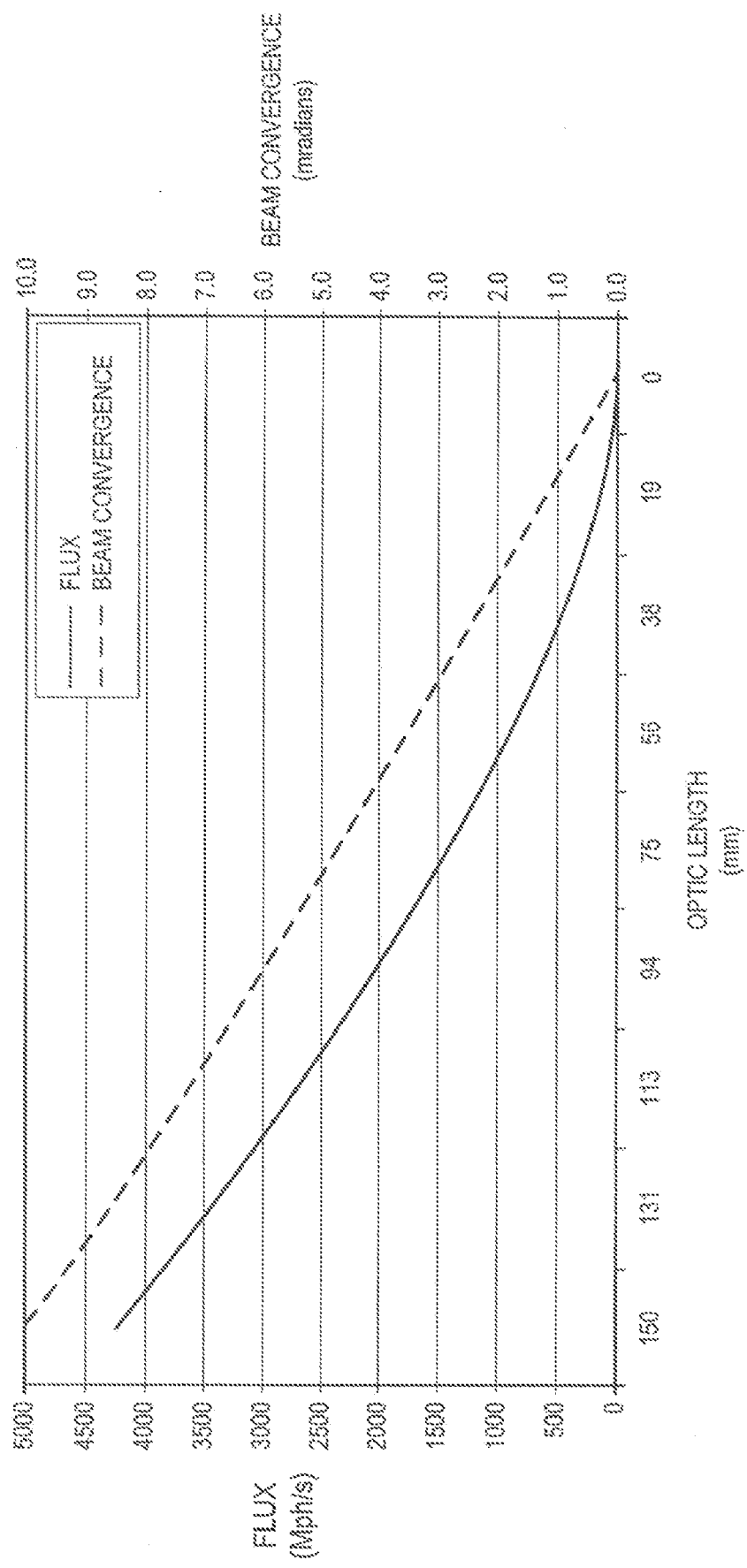
FIG. 8 is a plot showing flux and beam convergence as a function of optic length.

Similarly, the beam divergence may be a critical parameter for other applications. For instance, the diffraction or scattering patterns from single crystals (e.g., protein) of different unit cells (different d-spacing) may need beams with different divergences. A large unit cell requires a low divergence beam. A small unit cell can tolerate high divergence and therefore can take the benefit of high flux high divergence beam. FIG. 8 shows how the trade-off between the flux and beam convergence (divergence) could be set using the proposed adjustable apertures. Thus, the plots in FIGS. 7 and 8 illustrate that if the size of the beam that hits the optic is adjusted, and thus the working length of the optic is adjusted, an optimal trait for focal spot size, flux, or beam convergence can be determined and the proper adjustments may be made accordingly.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

The invention claimed is:

1. An x-ray optical system comprising:
a multiple corner optic assembly including a plurality of single corner Kirkpatrick-Baez side-by-side optics positioned about an optical axis, each single corner optic including a first reflective surface and a second reflective surface orthogonal to the first reflective surface, the first and second reflective surfaces extending from an optic entrance zone to an optic exit zone, the single corner optics being positioned about the optical axis such that the first and second reflective surfaces of each single corner optic face the optical axis and the optic entrance and exit zones of each single corner optic are respectively aligned defining an assembly entrance zone and an assembly exit zone, each single corner optic being configured to condition an x-ray beam having an x-ray wavelength, wherein the plurality of single corner optics includes a first single corner optic configured to condition a first x-ray beam having a first x-ray wavelength; and
an adjustable aperture assembly positioned at one of the assembly entrance and exit zones, the adjustable aperture assembly including at least one movable body portion having an aperture formed therethrough, wherein a first movable body portion is movable relative to the first single corner optic to adjust a size or shape of the first x-ray beam to at least one of adjust optic focal spot size, adjust convergence of the first x-ray beam, and occlude the first x-ray beam having the first x-ray wavelength.

2. The x-ray optical system of claim 1, wherein the first movable body portion is movable relative to the first single corner optic to define an open beam state, a closed beam state, and a partially open beam state, wherein the open beam state is defined when the first movable body portion is positioned relative to the first single corner optic such that the aperture of the first movable body portion is aligned with respect to the first x-ray beam so as to maximize the size of the first x-ray beam, wherein the closed beam state is defined when the first movable body portion is positioned relative to the first single corner optic such that the aperture of the first movable body portion is aligned with respect to the first x-ray beam so as to block the first x-ray beam, wherein the partially open beam state is defined when the first movable body portion is positioned relative to the first single corner optic in between the open beam state and the closed beam state.

3. The x-ray optical system of claim 2, wherein the first movable body portion is movable from the open beam state to the closed beam state in a first direction toward the optical axis and in a second direction away from the optical axis.

4. The x-ray optical system of claim 3, wherein the adjustable aperture assembly is positioned at the assembly entrance zone, wherein the first movable body portion adjusts optic focal spot size when moved in the first direction, and wherein the first movable body portion adjusts convergence of the first x-ray beam when moved in the second direction.

5. The x-ray optical system of claim 3, wherein the adjustable aperture assembly is positioned at the assembly exit zone, wherein the first movable body portion adjusts convergence of the first x-ray beam when moved in the first direction, and wherein the first movable body portion adjusts optic focal spot size when moved in the second direction.

6. The x-ray optical system of claim 1, wherein the first movable body portion is movable relative to more than one single corner optic to adjust the shape or size of more than one x-ray beam.

7. The x-ray optical system of claim 1, wherein the first movable body portion includes more than one aperture formed therethrough.

8. The x-ray optical system of claim 1, further comprising a fixed aperture assembly positioned at least one of the entrance and exit zones, the fixed aperture assembly including a fixed body portion and an aperture formed therethrough, the fixed body portion coupled to at least one of the single corner optics of the multiple corner optic assembly, the fixed body portion configured to block a portion of the x-rays entering the x-ray optical system.

9. The x-ray optical system of claim 8, wherein the fixed aperture assembly is positioned between the multiple corner optic assembly and the adjustable aperture assembly.

10. The x-ray optical system of claim 1, wherein the multiple corner optic assembly is non-symmetric.

11. The x-ray optical system of claim 1, wherein the multiple corner optic assembly is symmetric.

12. The x-ray optical system of claim 1, wherein the reflective surfaces are multi-layer Bragg surfaces, wherein the first single corner optic includes multilayer Bragg surfaces configured to reflect the first x-ray beam having the first wavelength, wherein a second single corner optic of the plurality of single corner optics includes multilayer Bragg surfaces configured to reflect a second x-ray beam having a second wavelength different from the first wavelength.

13. The x-ray optical system of claim 2, wherein the plurality of single corner optics includes a second single corner optic configured to condition a second x-ray beam having a second x-ray wavelength, wherein the adjustable aperture assembly includes a second movable body portion having a second aperture formed therethrough, wherein the second movable body portion is movable relative to the second single corner optic to adjust the size or shape of the second x-ray beam to at least one of adjust optic focal spot size, adjust convergence of the second x-ray beam, and occlude the x-ray beam having the second x-ray wavelength.

14. The x-ray optical system of claim 13, wherein the second movable body portion is movable relative to the second single corner optic between an open beam, a closed beam state, and a partially open beam state, wherein the open beam state is defined when the second movable body portion is positioned relative to the second single corner optic such that the aperture of the second movable body portion is aligned with respect to the second x-ray beam so as to maximize the size of the second x-ray beam, wherein the closed beam state is defined when the second movable body portion is positioned relative to the second single corner optic such that the aperture of the second movable body portion is aligned with respect to the second x-ray beam so as to block the second x-ray beam, wherein the partially open beam state is defined when the second movable body portion is positioned relative to the second single corner optic in between the open beam state and the closed beam state.

15. The x-ray optical system of claim 14, wherein the first movable body portion is positioned relative to the first single corner optic in the closed beam state when the second movable body portion is positioned relative to the second single corner optic in one of the open beam state and the partially open beam state, and wherein the second movable body portion is positioned relative to the second single corner optic in the closed beam state when the first movable body portion is positioned relative to the first single corner optic in one of the open beam state and the partially open beam state such that the optical system is capable of conditioning x-ray beams of one wavelength at a time.

16. The x-ray optical system of claim 1, wherein the plurality of single corner optics includes at least four single corner optics.

17. The x-ray optical system of claim 1, wherein the plurality of single corner optics are coupled together to form a substantially enclosed multiple corner optic assembly, the reflective surfaces of the single corner optics forming an inner surface of the optic assembly.

* * * * *